United States Patent [19]

Wilchynski

[11] Patent Number: 5,067,338
[45] Date of Patent: Nov. 26, 1991

[54] METAL WORKING ATTACHMENT FOR PORTABLE POWER TOOL

[76] Inventor: Ronald Wilchynski, P.O. Box 494, Cheshire, Conn. 06410

[21] Appl. No.: 466,971

[22] Filed: Jan. 18, 1990

[51] Int. Cl.$^5$ .............................................. B21D 5/14
[52] U.S. Cl. ........................................ 72/182; 72/237; 72/479; 72/481; 30/92; 30/500; 83/507
[58] Field of Search ................. 72/179, 182, 237, 479, 72/481; 30/92, 500; 29/560.1; 81/180.1, 181, 182; 83/500, 507, 571; 164/169.1

[56] References Cited

U.S. PATENT DOCUMENTS

| | | | |
|---|---|---|---|
| 1,828,829 | 10/1931 | Brown | 83/507 |
| 2,146,949 | 2/1939 | Flagler | 72/179 |
| 2,660,909 | 12/1953 | Morse et al. | 72/182 |
| 2,788,832 | 4/1957 | Switzer | 72/182 |
| 3,449,992 | 6/1969 | Hanaway | 30/92 |
| 4,381,605 | 5/1983 | Holm | 30/500 |

FOREIGN PATENT DOCUMENTS 553509  5/1943  United Kingdom .................. 83/507

Primary Examiner—Lowell A. Larson
Assistant Examiner—Thomas C. Schoeffler
Attorney, Agent, or Firm—McCormick, Paulding & Huber

[57] ABSTRACT

A metal forming tool attachment includes a body assembly having a front part and a rear part. A rotary forming element journalled on the rear part is driven by an input shaft which projects from the rear part for coupling engagement with the output shaft of an associated power tool. Another rotary forming element journalled for free rotation on the front part cooperates with the driven rotary forming element to form a nip region therebetween. An adjustment lever mounted on the rear part cooperates with a threaded member mounted in fixed position on the front part to move the front part generally toward and away from the rear part whereby the nip region between the forming rolls may be adjusted. A pair of spaced apart rotary forming elements carried by a mounting plate pivotally supported on the front part may be substituted for the single rotary forming element carried by the front part to adapt the tool attachment to perform a radial bending operating. The tool attachment may also be set up to perform a circular disk cutting or trimming operation.

16 Claims, 2 Drawing Sheets

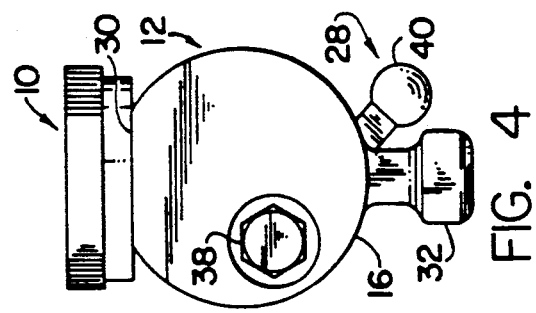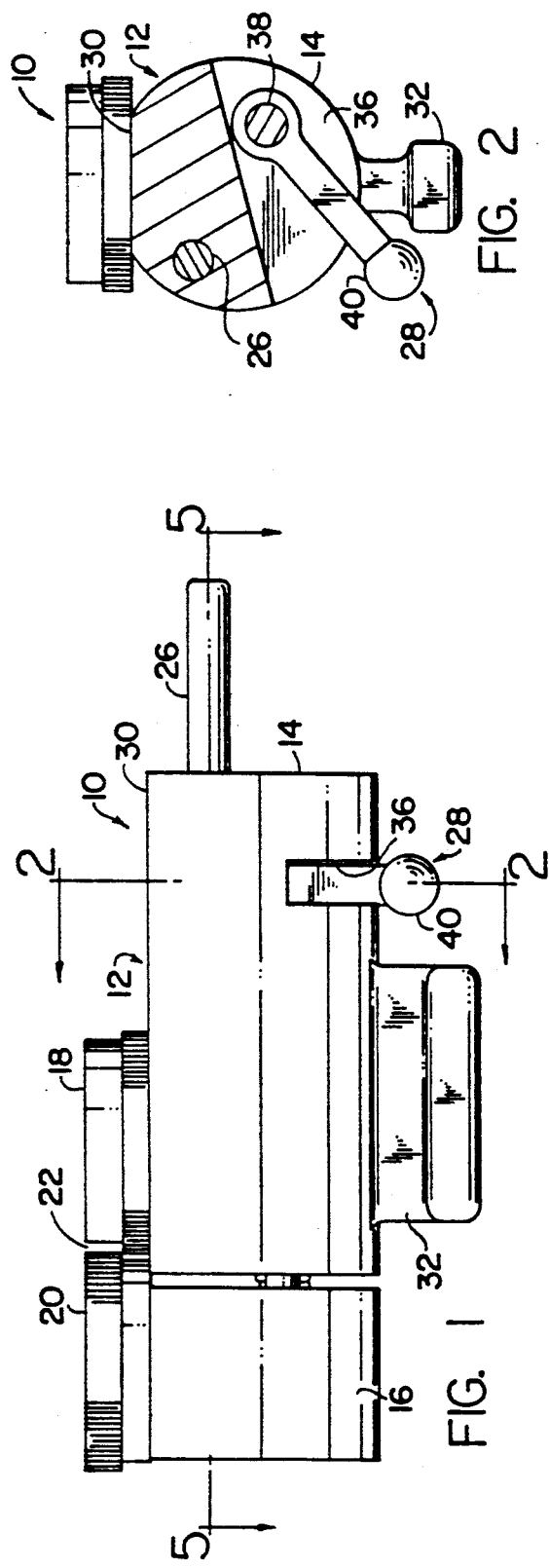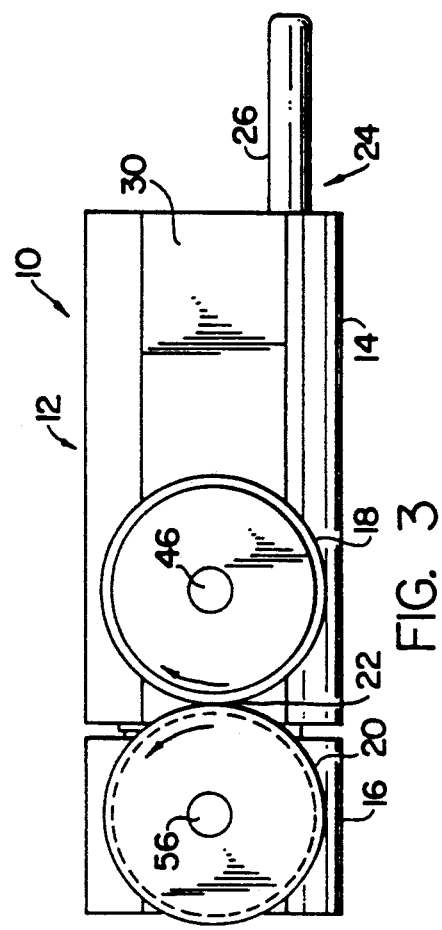

METAL WORKING ATTACHMENT FOR PORTABLE POWER TOOL

BACKGROUND OF THE INVENTION

This invention relates in general to metal working tools and the like and deals more particularly with an improved sheet metal working tool attachment for a portable power operated tool of the type having a rotary output shaft. The present invention is more specifically concerned with an improved tool attachment which may be set up to perform a variety of light duty sheet metal working operations.

Such portable sheet metal working tools as heretofore available are generally relatively expensive special purpose tools capable of performing only a single metal working operation. There is a definite need for an improved light duty sheet metal working tool for low cost production which will suit the needs of automotive body shops, aircraft repair and maintenance shops and like facilities where metal cutting, edge forming and radial bending operations are performed.

It is the general aim of the present invention to provide an improved versatile light duty sheet metal working tool attachment for a portable power tool having a rotary output shaft. A further aim of the invention is to provide a tool attachment capable of being set up to perform various sheet metal working operations and which may be produced at relatively low cost to satisfy the aforesaid need.

BRIEF DESCRIPTION OF THE DRAWINGS

FIG. 1 is a side elevational view of a metal working tool attachment embodying the present invention.

FIG. 2 is a sectional view of the tool attachment taken along the line 2—2 of FIG. 1.

FIG. 3 is a plan view of the tool attachment.

FIG. 4 is front elevational view of the tool attachment.

DETAILED DESCRIPTION OF PREFERRED EMBODIMENTS

Figure 6:
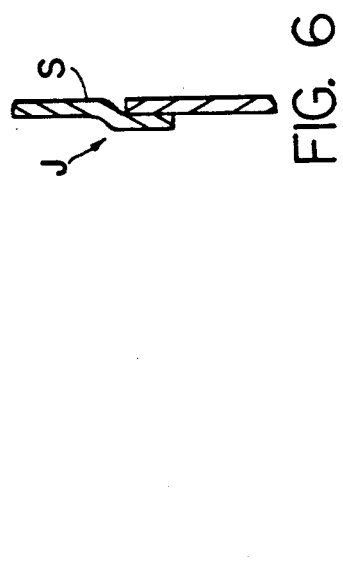
FIG. 6 is a fragmentary sectional view through a typical sheet metal joint formed by using the tool attachment of FIGS. 1-5.

Turning now to the drawings and referring first particularly to FIGS. 1-5, a metal working tool attachment embodying the present invention is indicated generally by the reference numeral 10. The illustrated tool attachment 10 comprises a sheet metal forming tool particularly adapted for coupling to a rotary output shaft of portable power operated tool (not shown), such as pneumatically or electrically driven portable drill, to form the marginal edge portion of a piece of sheet metal.

The tool 10 has an axially elongated body assembly indicated generally at 12 which includes a rear part 14 and a front part 16. A plurality of rotary metal forming tools which include a rotary drive tool 18 and at least one opposing reaction tool 20, mounted on the rear part 14 and the front part 16, respectively, cooperate to form a nip region 22 therebetween, as best shown in FIG. 3. The drive tool 18 is rotated by an associated drive mechanism, indicated generally at 24, which includes a rotary input shaft 26. Adjusting mechanism, indicated generally at 28, is provided for moving the front part 16 and its associated reaction tool 20 generally toward and away from the rear part 14 to adjust the size of the nip 22 between the forming tools 18 and 20 to cause the forming tools to engage and grip the marginal edge portion of a piece of sheet material fed into the nip 22. The marginal portion of the sheet material is formed as it passes through the nip 22, all of which will be hereinafter more fully discussed.

Figure 5:
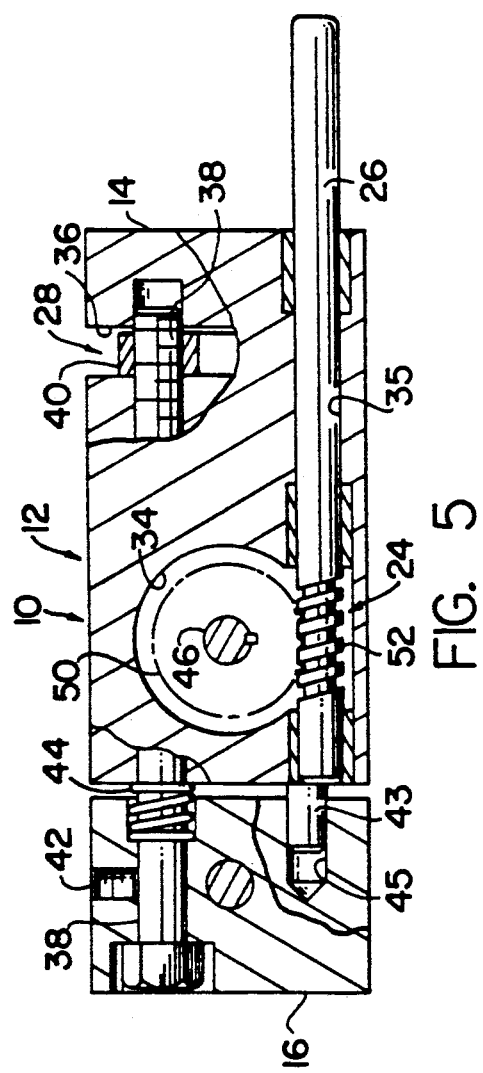
FIG. 5 is a sectional view taken generally along the line 5—5 of FIG. 1.

Considering now the tool attachment 10 in further detail, the body assembly may take various forms, but, preferably and as shown, the rear and front parts 14 and 16 are generally cylindrical and have substantially flat coplanar outer peripheral surface portions which cooperate to define a substantially flat surface 30 on the body assembly. An integral anvil like mounting base 32 depends from the central portion of the rear part 14 and extends along a lower surface of the rear part as it appears oriented in the drawings. The mounting base 32 enables the tool attachment 10 to be clamped in a bench vise or the like when it is desired to mount the tool attachment in a stationary position to perform light bench work operations on sheet metal. A recess 34 formed in the rear part 14 opens through the flat surface 30 and is intersected by a stepped bore 35 which extends longitudinally through the rear part 14, as shown in FIG. 5, for a purpose which will be hereinafter further evident. The rear part also defines a radially disposed generally downwardly open slot 36.

The front part 16 is connected to the rear part 14 for adjustable movement generally toward and away from the rear part by an elongated threaded member or bolt 38 which extends in generally parallel relation to the axis of the body assembly through the front part 16 into the rear part 14 and across the slot 36 as shown in FIG. 5. A set screw 42 threaded into the front part 16 engages the bolt 38 to restrain it against rotation relative to the body assembly 12. The threaded portion of the bolt 38 exposed within the slot 36 is threadably engaged with an adjustment lever 40 received within and projecting from the slot. The adjustment lever 40 comprises part of the adjusting mechanism 28, is angularly moveable relative to the body assembly 12 and the bolt 38 and constrained against forward and rearward movement relative to the rear part 14 by the front and rear walls of the slot 38. A dowel pin 43 mounted in fixed position in the rear part 14 in axially parallel relation to the bolt 38 projects forwardly from the rear part into a blind bore 45 formed in the front part 16 and cooperates with the bolt 38 to support and retain the front part in general coaxial alignment with the rear part and prevent angular movement of the front part relative to the rear part. A coil spring 44 received on the bolt 38 and disposed between the front and rear parts, as best shown in FIG. 5, biases the front part 16 in a forward direction away from the rear part 14. Angular movement of the adjustment lever 40 relative to the bolt 38 moves the front part in an axial direction either toward or away from the rear part. The biasing force exerted by the spring 44 maintains the lever 40 in frictional engagement with the rearwardly facing surface of the slot 36 and maintains the threads on the bolt in frictional engagement with the threads on the adjustment lever 40 to retain the lever in a desired fixed position of adjustment.

The illustrated rotary drive tool 18 comprises an edge forming tool supported adjacent the surface 30 for rotation about a vertical axis on and relative to the rear part 14 by a threaded stud 46 threadably engaged in the rear part. A pinion 50 mounted on the stud 46 is keyed or otherwise secured in fixed position relative to the rotary drive tool 18. The pinion 50 is contained within the recess 34 and disposed in driving engagement with a worm gear 52 mounted on an input shaft 26 which is journalled within the rear part 14 and extends through the recess 34. The shaft 26 projects for some distance rearwardly from the rear part 14 and is particularly adapted for coupling engagement with the output shaft of an associated power tool (not shown).

The reaction tool 20 comprises an edge forming tool which generally complements the edge forming tool 18 and is supported for free rotation relative to the front part 16 by another threaded stud 56 threadably engaged in the front part in axially parallel relation to the stud 46.

The illustrated tool attachment 10 is particularly adapted to form the marginal portion of a piece of sheet metal S used to form a lap joint with another sheet of like material so that two associated surfaces of the two sheets lie within a common plane. Such a joint, indicated generally by the letter J in FIG. 6, is particularly useful in automotive body repair work, for example.

Figure 8:
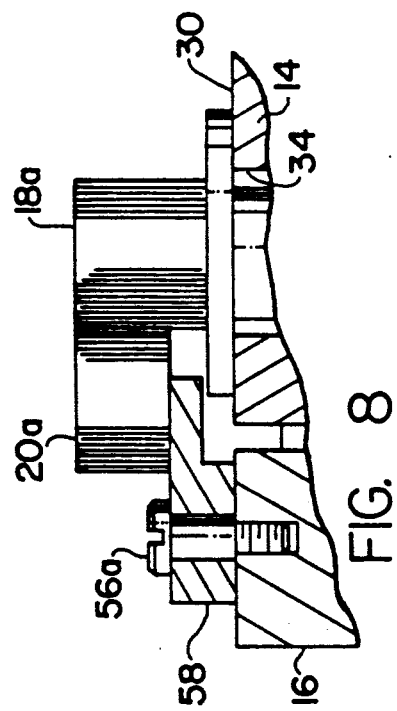
FIG. 8 is a fragmentary sectional view taken along the line 8—8 of FIG. 7.
Figure 7:
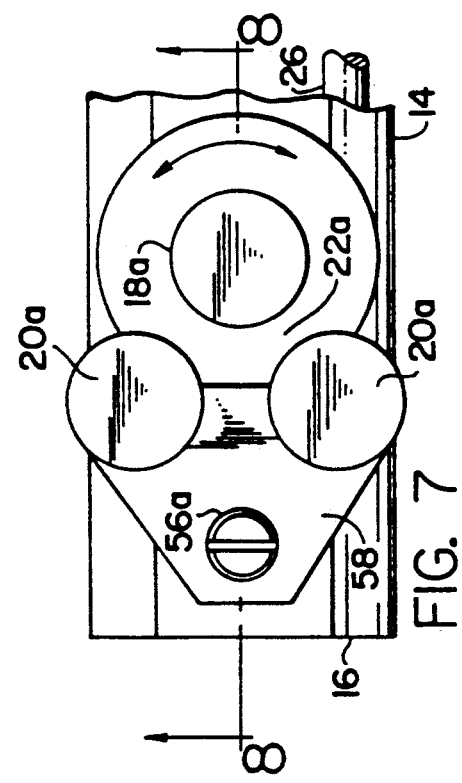
FIG. 7 is a fragmentary plan view of the tool attachment shown set up to perform a radius bending operation.

In FIGS. 7 and 8 the tool attachment 10 is shown set up to perform a radial bending operation. At least three rotary tools are required for this purpose and it will be noted that two generally cylindrical rotary reaction tools 20a and 20a' have been substituted for the single rotary reaction tool 20, previously described.

The rotary drive tool indicated at 18a includes a generally cylindrical base portion and an integral cylindrical upper portion of somewhat smaller diameter which is coaxially aligned with the base portion. The tool 18a is keyed or otherwise suitably secured to the pinion 50 to rotate with it in response to rotation of the input shaft 26.

A carrier member or plate 58 pivotally supported on the front part 16 generally adjacent the flat surface 30 thereof by a pivot stud 56a carries the tools 20a and 20a'.

Assuming that the drive tool 18a is driven in a clockwise direction, as it appears in FIG. 7, a workpiece to be radially bent (not shown) is fed into the nip 22a between the rotating tool 18a and the reaction tool 20a and is brought into engagement with the reaction tool 20a'. The leading edge of the workpiece will be drawn toward and into the nip 22a' between the drive tool 18a and the reaction tool 20a', whereupon the plate 58 will pivot to a position wherein the centers of the tool 20a and 20a' are substantially equidistant from the center of the drive tool 18a. As the workpiece passes through the nip 22a and 22a' the portion of the workpiece engaged by the tools will be formed with a radial bend. It will now be apparent that the radius of the bend will be determined by the relative spacing between the three tools 18a, 20a and 20a'.

I claim:

1. Metal working tool attachment for a portable power tool having a rotary output shaft and comprising an elongate generally cylindrical body assembly which defines a first longitudinal axis, said body assembly having a front part and a rear part, mounting means for supporting said front part for rectilinear movement along said first longitudinal axis toward and away from said rear part, a rotary drive tool journalled for rotation on said rear part and about a first transverse axis generally normal to the direction of extent of said first longitudinal axis, driving means on said rear part for coupling engagement with said output shaft on said associated portable power tool to rotate said drive tool and including a drive shaft journalled on said rear part along a second longitudinal axis parallel to said first longitudinal axis, said drive shaft extending in a rearward direction from and beyond said rear part for rotation about said second longitudinal axis, at least one rotary reaction tool journalled for free rotation on said front part about a second transverse axis parallel to said first transverse axis, said reaction tool cooperating with said drive tool to form a nip region therebetween, and adjusting means for moving said front part in a direction along said first longitudinal axis toward and away from said rear part to adjust the position of said reaction tool relative to said drive tool.

2. Metal working tool attachment as set forth in claim 1 wherein said adjusting means includes a threaded member mounted in fixed position relative to said front part and an adjustment lever engaging said rear part and threadably engaged with said threaded member.

3. Metal working tool attachment as set forth in claim 2 wherein said adjusting means includes biasing means for urging said front part in a direction away from said rear part.

4. Metal working tool attachment as set forth in claim 3 wherein said biasing means includes a spring disposed between said front part and said rear part.

5. Metal working tool as set forth in claim 4 wherein said spring is mounted on said threaded member.

6. Metal working tool attachment as set forth in claim 1 wherein said mounting means comprises said adjusting means.

7. Metal working tool attachment as set forth in claim 6 wherein said mounting means comprises an elongate threaded member mounted in fixed position on said front part and extending into said rear part and transversely across a slot defined by said rear part and said adjusting means includes an adjusting lever threadably engaged with said elongate threaded member within said slot.

8. Metal working tool attachment as set forth in claim 1 wherein said tool attachment includes a mounting plate supported on said front part and a pair of rotary reaction tools carried by said mounting plate, each of said reaction tools cooperating with said drive tool to define an associated nip region therebetween.

9. Metal working tool attachment as set forth in claim 8 wherein said mounting plate is pivotally supported on said front part.

10. Metal working tool attachment as set forth in claim 1 wherein said rotary drive tool and said one rotary reaction tool comprises forming tools.

11. Metal working tool attachment as set forth in claim 1 wherein said rotary drive tool and said one rotary reaction tool comprise shearing tools.

12. Metal working tool attachment as set forth in claim 1 including mounting means for supporting said tool attachment in a bench vise including an integral anvil-like mounting base depending from a central portion of said rear part.

13. Metal working tool attachment for coupling engagement with a rotary output shaft on an associated portable power tool and comprising an elongate generally cylindrical body assembly which defines a first longitudinal axis, said body assembly including separate front and rear ports having substantially flat coplanar outer peripheral surface portions cooperating to define a substantially flat outer surface portion of said body assembly, mounting means for supporting said front part to move along said first longitudinal axis toward and away from said rear part, a plurality of rotary metal working tools supported on said body assembly for rotation relative thereto and defining at least one nip region therebetween and including a drive tool supported along a first transverse axis normal to the direction of extent of said first longitudinal axis and on said rear part generally adjacent said flat outer surface portion for rotation about said first transverse axis and at least one rotary reaction tool supported on said front part for free rotation about a second transverse axis parallel to said first transverse axis, drive means for rotating said drive tool about said first transverse axis and relative to said rear part and including a drive shaft journalled for rotation on said rear part about a second longitudinal axis parallel to said first longitudinal axis, said drive shaft extending from said rear part and for some distance beyond said rear part for coupling engagement with said output shaft of said associated portable power tool, a worm gear mounted in fixed position on said drive shaft and a pinion meshingly engaged with said worm gear, adjusting means for moving said front part along said first longitudinal axis relative to said rear part to vary said nip region between said drive tool and said reaction tool and including a threaded member mounted in fixed position on said front part and extending into said rear part and an adjustment lever supported on said rear part for angular movement within a slot formed in said rear part and threadably engaged with said threaded member within said slot.

14. Metal working tool attachment as set forth in claim 13 wherein said adjusting means includes a spring carried by said threaded member and disposed between said front part and said rear part.

15. Metal working tool attachment as set forth in claim 13 wherein body assembly includes a mounting plate and means supporting said mounting plate on said front part to pivot about an axis generally parallel to the axis of said drive tool and said metal working attachment includes two reaction tools journalled for rotation on said mounting plate in spaced relation to each other for rotation about axes parallel to the axis of said drive tool.

16. Metal working tool attachment as set forth in claim 13 including mounting means for supporting said tool attachment in a bench vise including an integral anvil-like mounting base depending from a central portion of said rear part.

* * * * *